(12) United States Patent
Bauman et al.

(10) Patent No.: US 6,211,672 B1
(45) Date of Patent: Apr. 3, 2001

(54) HUMAN APPENDAGE MOUNTED METAL DETECTOR

(75) Inventors: Verne W. Bauman, Westlake Village; Samuel R. Bernstein, Thousand Oaks; Robert A. Dovidio, Westlake Village, all of CA (US)

(73) Assignee: Triple Tech, LLC, Newbury Park, CA (US)

( * ) Notice: Subject to any disclaimer, the term of this patent is extended or adjusted under 35 U.S.C. 154(b) by 0 days.

(21) Appl. No.: 09/217,303

(22) Filed: Dec. 21, 1998

(51) Int. Cl.[7] .......................... G01N 27/72; G01R 33/00; G01V 3/11
(52) U.S. Cl. .......................... 324/226; 324/326; 324/236; 324/327
(58) Field of Search .................... 324/326, 327, 324/328, 329, 226, 228, 234, 236, 239; 307/116, 125; 361/179, 180; 2/159, 160; 340/551; D10/46, 47, 75, 78

(56) References Cited

U.S. PATENT DOCUMENTS

| D. 240,119 | 6/1976 | Yue et al. .............................. D10/47 |
| D. 251,363 | 3/1979 | Hénault et al. ....................... D10/47 |
| D. 257,328 | 10/1980 | Schwartz .............................. D10/47 |
| D. 282,350 | 1/1986 | Thomas et al. ....................... D10/47 |
| D. 346,977 | 5/1994 | Fiske .................................... D10/47 |
| D. 374,829 | 10/1996 | Yue ...................................... D10/47 |
| D. 399,445 | * 10/1998 | Camano ............................. D10/104 |
| 1,679,339 | 7/1928 | Herr . |
| 3,453,532 | 7/1969 | Gardiner ................................ 324/3 |
| 3,714,563 | 1/1973 | Voll ...................................... 324/67 |
| 4,423,377 | 12/1983 | Podhrasky ........................... 324/329 |
| 4,526,177 | 7/1985 | Rudy .................................... 128/737 |
| 4,814,632 | * 3/1989 | Glaeser et al. ....................... 307/116 |
| 4,859,931 | 8/1989 | Yamashita et al. .................... 324/67 |
| 5,959,451 | * 9/1999 | De Torfino .......................... 324/236 |

* cited by examiner

Primary Examiner—Walter E. Snow
(74) Attorney, Agent, or Firm—Jack C. Munro

(57) ABSTRACT

A metal detector that is to be attached to a human appendage and preferably the wrist and hand of a human. A metal detector includes a housing which is to be worn strictly by the human hand or the hand and the wrist. One version of the metal detector would be in the form of a glove. The second version would be in the form of a flexible base which is mounted between the hand and the wrist by a strap arrangement. Within both versions, there is a search coil located in the palm area of the hand. A metal detection circuit battery source is mounted on the portion of the housing that is located directly against the backside of the hand.

8 Claims, 4 Drawing Sheets

HUMAN APPENDAGE MOUNTED METAL DETECTOR

BACKGROUND OF THE INVENTION

1. Field of the Invention

The field of this invention is directed to metal detection devices and more particularly to a metal detection device which is to be directly mounted on a human hand.

2. Description of the Prior Art

Metals have one important property possessed by no other elements such to be readily distinguished with suitably sensitive apparatus. This property is their high electrical conductivity. By generating an alternating magnetic field in the vicinity of a metal object, electric currents are induced in the object which in turn set up a magnetic field around the object which distorts the original field. By detecting this distortion, the metal object can be located.

One common type of metal detector is deemed a pulse magnetization unit. Pulse magnetization units rely on the fact that a magnetic field takes a finite time to propagate through air or earth. The speed of propagation is the same as for electromagnetic radiation, that is, the speed of light. Such units operate as magnetic "radar" units. A short, high-powered pulse is generated in a search coil, and after the pulse is cut off, the unit goes from a transmit mode to receive mode. If there is a metallic object within the field, this object generates its own magnetic field by the process of induced magnetism, and this is detected a finite time after the transmitted pulse. Such metal detectors are used to detect coins, jewelry and any metallic object on beaches, parks and other places common to the usage by humans. Some people have made it a hobby to use such metal detectors to discover such lost metallic objects.

However, metal detectors are also used as stationary units within airports. The purpose of the stationary metal detector is to detect the presence of a dense metallic object on a person before that person enters an airplane either as a passenger or a crew member. Metal detectors are also used as portable units which can be readily carried by a person. These portable units are the detectors that are used to detect the presence of metal within areas, such as beaches and parks, that are frequently used as places of congregation by people.

Within the field of law enforcement, portable metal detectors are commonly used to detect the presence of metallic objects on a person that is subject to detainment. Normally, the metallic object that is being looked for is a knife or a gun. Typically, such metal detectors are in the shape of a "wand". This wand comprises a hand graspable cylindrical object, usually about ten inches in length, that is intended to be moved in close proximity to the person that is being examined. Upon a metal object being detected, the metal detector will activate an annunciator which can be in the form of a vibrator, a light or a buzzer. The metal object can then be removed from the person that is being examined.

One problem with such a wand type of annunciator is that it requires that one hand of the operator be used to operate the metal detector. In law enforcement, it would be preferable to use a metal detector which did not require the entire usage of ones hand thereby leaving that hand free to perform other tasks such as permit the physical grasping of a discovered metallic object. It may also save a law enforcement officer's life to have available both hands to counter a physical accostation rather than having one hand occupied.

SUMMARY OF THE INVENTION

A metal detector circuit and power supply which is mounted in conjunction with a housing. The metal detector circuit includes a search coil, this search coil being included in the portion of the housing that is to be located directly adjacent the palm of a human hand. Typically, the housing could comprise a glove or could comprise a sheet material, flexible base upon which are mounted a pair of straps. One of the straps is to be located across the palm of the hand with the search coil being mounted in conjunction with this strap. The remaining strap is to include a disconnectable attachment such as a fastener arrangement that is commonly sold under the tradename of "Velcro". This strap is to be generally wound around the wrist of the user. The battery for the detection circuit and the detection circuit are usually mounted on the portion of the base which is located directly adjacent the back of the hand.

A primary objective of the present invention is to construct a small size metal detector which is attached directly to the user's hand which leaves the user hand free to perform other tasks even while using the metal detection device.

Another objective of the metal detector of the present invention is to construct a metal detector which can be manufactured at a reasonable price and therefor sold to the ultimate consumer at a reasonable price.

Another advantage of one version of the metal detection apparatus of this invention is that it is constructed so as to be readily mountable on either the left hand or the right hand of the user.

Another objective of one version of the metal detector of the present invention is that the detector is not size dependent on the size of the hand on which it is mounted.

DETAILED DESCRIPTION OF THE PREFERRED EMBODIMENT

Figure 1:
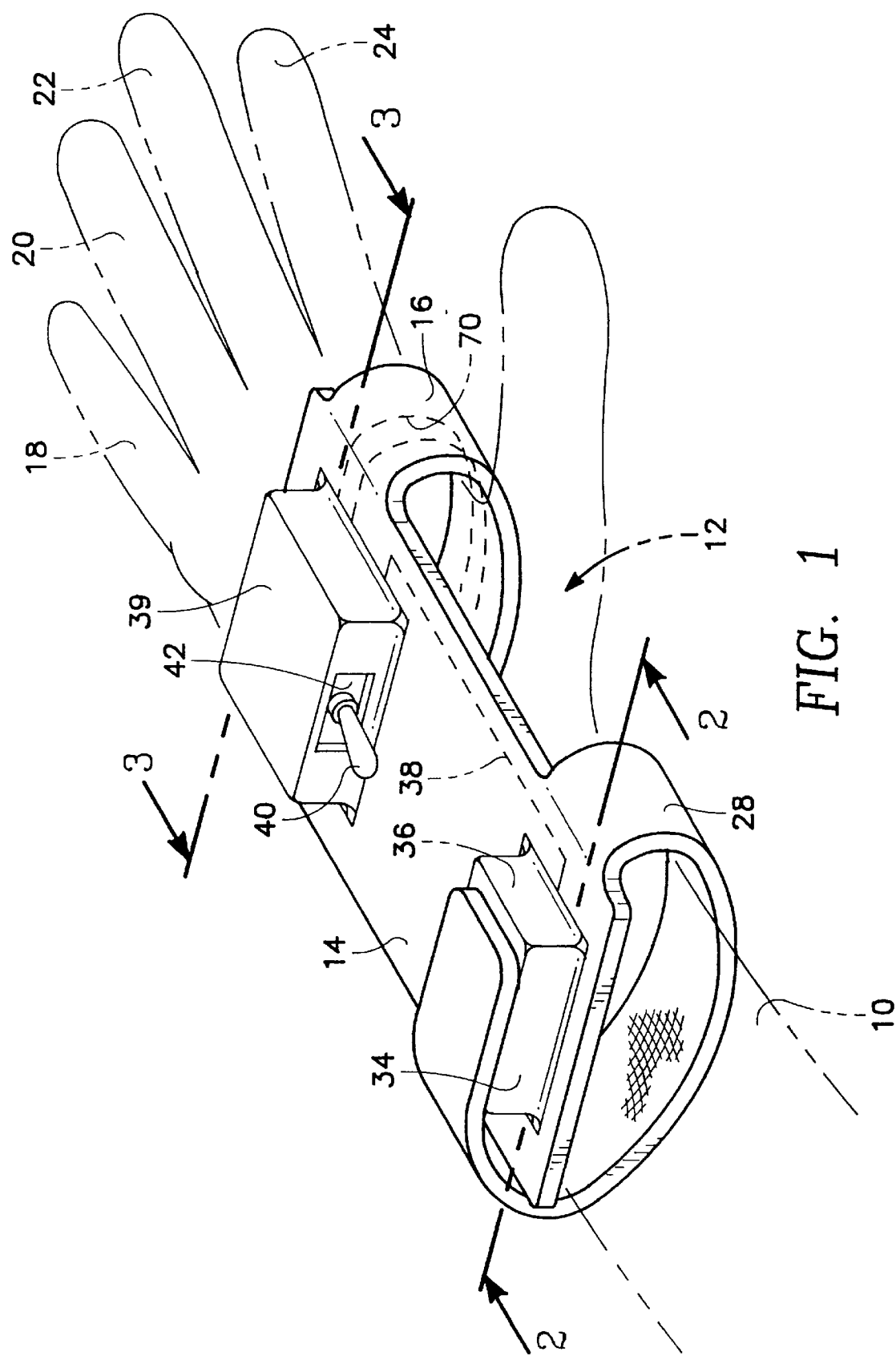
FIG. 1 shows an exterior isometric backside view of the metal detector of the present invention showing such as it is mounted on a human appendage in the form of a hand and wrist.
Figure 2:
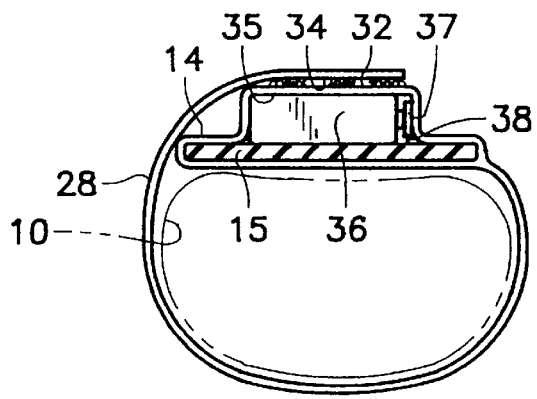
FIG. 2 is a left end view of the metal detector of the present invention taken along line 2—2 of FIG. 1.

Referring particularly to FIG. 1, there is shown in phantom lines a human wrist 10 which is connected to a human hand 12. A housing in the form of a sheet material base 14 is mounted against the upper surface of the hand 12 and the upper surface of the wrist 10. The sheet material base 15 is basically of a rectangular configuration. A typical material of construction for the base 15 would possibly be a semi-rigid plastic with this plastic covered by fabric 14 would be preferable. It is to be understood that the base 15 is to have a certain amount of flexibility to be capable of slightly changing shape so as to conform to the individual configurations of user's hands 12 and wrist 10.

Figure 3:
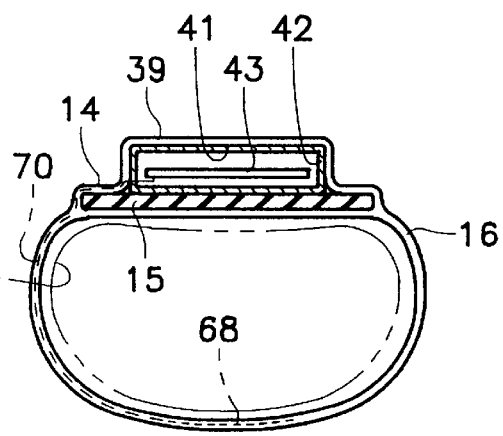
FIG. 3 is a right end view of the metal detector of the present invention taken along line 3—3 of FIG. 1.
Figure 4:
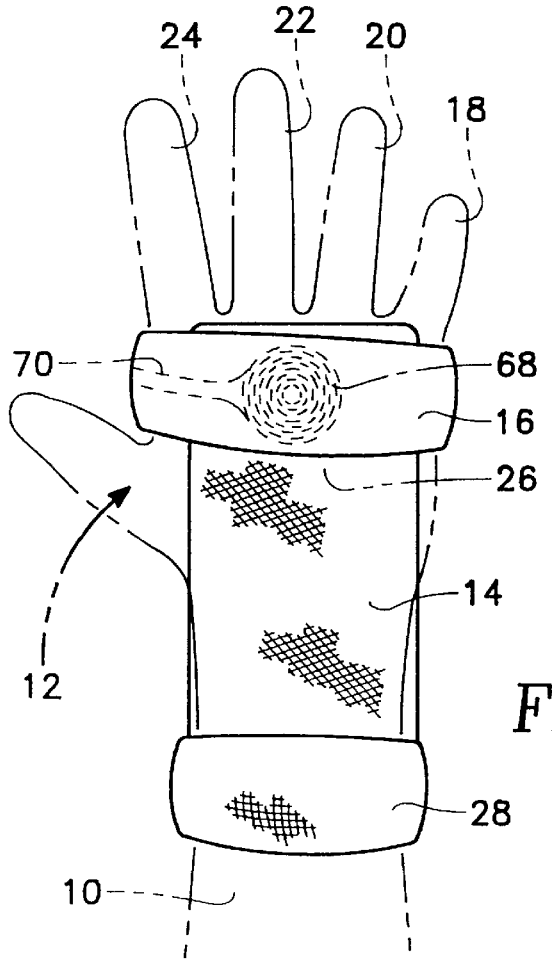
FIG. 4 is a bottom view of the metal detector of the present invention showing more clearly the mounting arrangement of the metal detector in conjunction with the palm area of the hand.

At the fore end of the base 15, there is attached an elastic band 16. The elastic band 16 is to be somewhat stretchable and is continuous. The user's fingers 18, 20, 22, and 24 are to be slipped through the open area enclosed by the elastic band 16 with the elastic band 16 forming a tight fit across the palm section 26 of the hand 12. Connected to the aft end of the base 15 is an attaching strap 28. The outer end of the attaching strap 28 includes a fastener pad 30. A similar fastener pad 32 is mounted on the exterior surface of a battery pouch 34. When the attaching strap 28 is wrapped to the desired degree of tightness about the wrist 10, the fastener pads 30 and 32 are engaged which retains the attaching strap 28 in an attached position relative to the base 15. The battery pouch 34 is mounted on the sheet material base 15. The battery pouch 34 is to provide a compartment 35 to retain a conventional battery 36. Typically, the battery 36 will comprise a nine volt battery. The pouch 34 will generally be constructed of a fabric material. Within the pouch 34, the battery 36 is connected by battery connector 37 to conductor 38 to an on/off switch 40 which is mounted on circuit housing 42. Within the circuit housing 42 is located the circuit shown in FIG. 3. The circuit housing 42 is mounted within pouch compartment 41 of pouch 39. The circuit board 43 includes the electrical circuit of FIG. 5.

It is to be noted that the base 15 can be mounted on either the user's left hand or right hand with the elastic band 16 extending across the palm section 26 of either hand. Therefore, the embodiment shown in FIG. 1 of the drawings is not size dependent and is not dependent upon being applied to a particular hand as it would be applicable to both.

Figure 5:
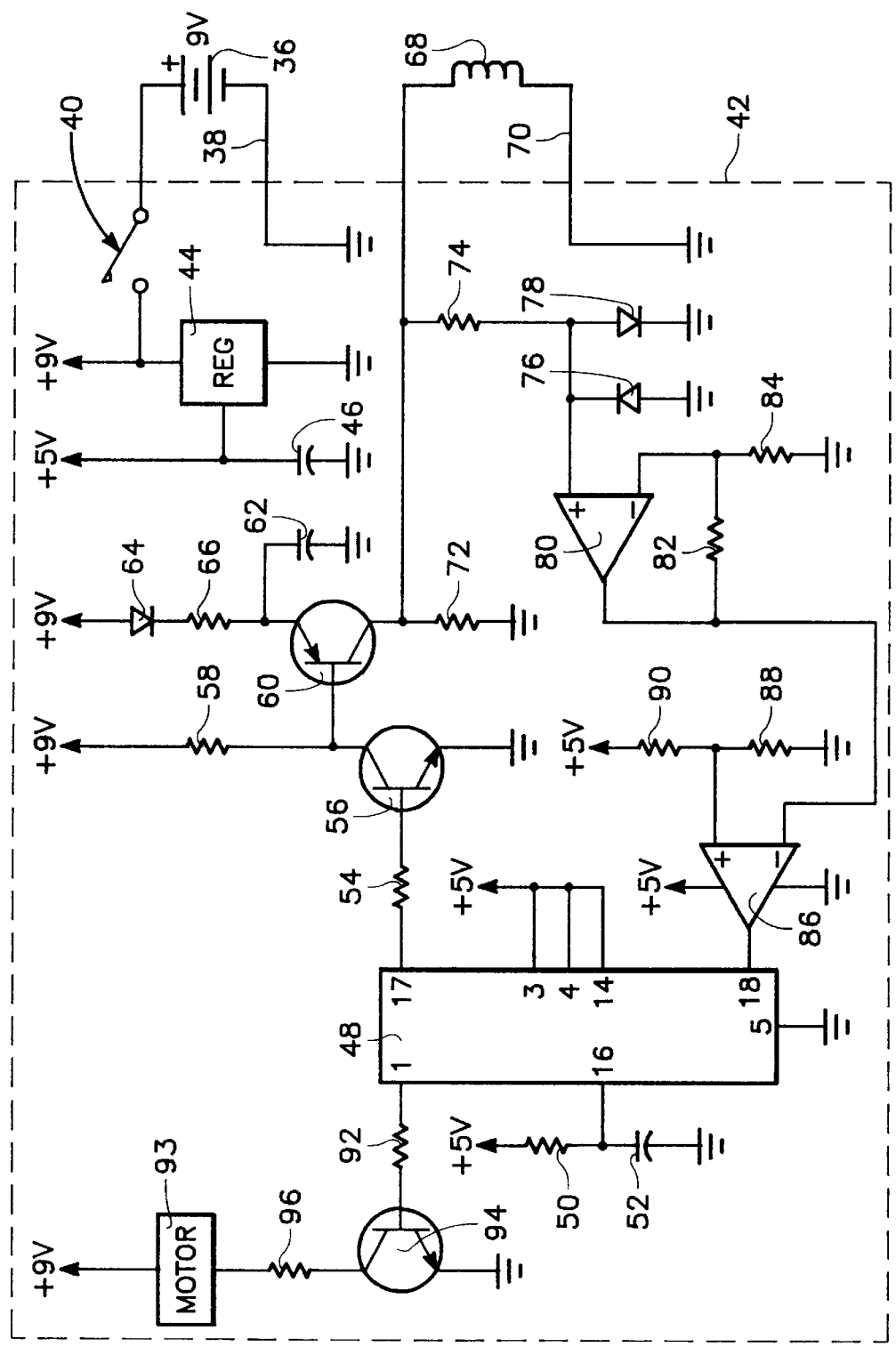
FIG. 5 is an electrical schematic of the metal detector circuit that is utilized in conjunction with the metal detector of the present invention.

Power for the circuit shown in FIG. 5 is supplied from the nine volt battery 36 through the on/off switch 40 which comprises a single pole, single throw, toggle switch. When the switch 40 is closed, voltage is applied to a three terminal, five volt regulator 44. A part number LM78LO5 of National Semiconductor could be used for the five volt regulator 44. A 0.1 microfarad (uf) decoupling capacitor 46 is used to reduce noise and transients on the five volt power line.

A microcontroller 48, such as micro chip PIC16C54 of National Semiconductor, has eight bits. This microcontroller 48 develops and controls the timing signals required. Resistor 50 and capacitor 52, twenty pico farads (pf), form a resistor/capacitor clock of approximately four megahertz (MhZ) which causes an instruction to be executed every one microsecond within the microcontroller 48.

The process by which metal is detected starts with a thirty microsecond positive pulse generated by the microcontroller 48 on pin 17. This pulse is coupled through a one kiloohm (Kohm) resistor 54 to the base of NPN transistor 56. Transistor 56 saturates and pulls the voltage at biasing resistor 58 low which causes the PNP power Darlington transistor 60 to switch on. Capacitor 62, which is charged through decoupling diode 64 and current limiting resistor 66 to approximately nine volts when transistor 60 is off, now discharges through transistor 60 into the search coil 68 causing a large current to flow. Part No. TIP115 of National Semiconductor would be satisfactory for the transistor 60. The search coil 68 is mounted within the elastic band 16. The conductor 70 connects with the search coil 68.

The search coil 68 consists of five feet in length of number 30 magnet wire wound on a one inch diameter air core. The high current pulse through the search coil 68 causes a magnetic field to be produced. The end of the thirty microsecond pulse abruptly turns off transistor 60. The collapsing magnetic field causes a large negative voltage to be induced across the search coil 68. This negative voltage collapses producing a weak positive overshoot. Resistor 72 dampens the circuit to one positive over-shoot. These voltage fluctuations are coupled through resistor 74 and limited to 0.6 volts by diodes 76 and 78 at the input to amplifier 80. The amplifier 80 consists of one-quarter of a quad operational amplifier, part number LM324, manufactured by National Semiconductor. Resistors 82 and 84 set the gain of the amplifier 80 at one thousand. The resulting highly amplified signal is applied to comparator 86 which consists of another one-quarter segment of the quad operational amplifier. Resistors 88 and 90 set the comparators 86 switch point at approximately 2.1 volts.

In the absence of metal near the search coil 68, the output of the comparators 86 drops to zero volts for approximately 110 microseconds. As a metal object (not shown) is brought near the search coil 68, the voltage across the search coil 68 stabilizes sooner. This reduces the time the comparator 86 is at zero volts. The time the comparator 86 is low is indicative of the size and proximity of the metal to the search coil 68. Normal times range from 110 microseconds with no metal present to 70 microseconds for a piece of metal the size of a penny directly next to the search coil 68 or a pistol a short distance away from the search coil 68. This negative pulse is presented to the microcontroller at 48 on pin 18. The microcontroller 48 counts the number of instructions it can execute while pin 18 is low. The number thus produced is a quantification of metal near the search coil 68.

It is desirable in the application to indicate to the operator not only the presence of metal near the search coil 68 but its relative size and location. This indication is provided by subtracting the current number (count of how long pin 18 is low) from the previous number measurement. A positive difference indicates that the search coil 68 is approaching a metal object. A negative difference indicates that the search coil 68 is farther from the metal object. The microcontroller 48 accumulates these positive and negative differences. Negative accumulations are ignored and set to zero.

A small DC motor 93 with an offset weight on its shaft (not shown), similar to those found in pocket pagers, is used to inform the operator of presence and location of metal near the search coil 68 by the vibrations produced while the motor 93 is on. This is controlled by pin number 1 of the microcontroller 48. When pin number 1 is set high, current flows through resistor 92 saturating switch transistor 94. When transistor 94 is on, current flows through the motor 93 and current limiting resistor 96. The output of the motor 93 produces relatively strong vibrations which can be easily felt by the user.

Because of the dynamic nature of the circuit, the microcontroller 48 pulses the motor 93 one-fourth of a second on and one-fourth of a second off when indicating the presence of positive accumulations. This allows time to take a reading between pulses. The new difference value is computed and combined with previous accumulations. After each pulse, the accumulated value is decremented. A negative accumulation is set to zero. In this way, the process produces motor pulses when the search coil 68 is approaching metal and stops producing motor pulses within motor 93 when the search coil 68 is receding from metal. This technique produces a dynamic measurement which has two advantages over setting a value below which the circuit would indicate metal in the proximity. First, there is no need for adjustments to compensate for conditions, component differences and circuit drift. Circuit drift might be caused due to heat while an example of component differences would be slight changes in the output of the battery 36. Any ambient condition is automatically adjusted for while the circuit remains at maximum sensitivity. Second, the circuit provides an indication while the search coil 68 is approaching a metal abject. This is significantly more information than just a metal object is nearby. These advantages allow the operator to quickly determine the amount of metal present and its precise location.

Usage of the metal detector shown. in FIG. 1, when activated, requires that the user's hand 12 be placed in close proximity to a metal object. A typical usage would be by a law enforcement officer when "padding a suspect down". Upon the motor 93 being activated, the operator then knows to venture within the suspect's clothes in order to ascertain what type of metal has been detected. The purpose is to discover a dangerous piece of metal such as a gun or knife. It is to be noted that the structure shown in FIG. 1 can be mounted on either hand of the operator, not being required to be mounted on a single hand.

Figures 6, 7:
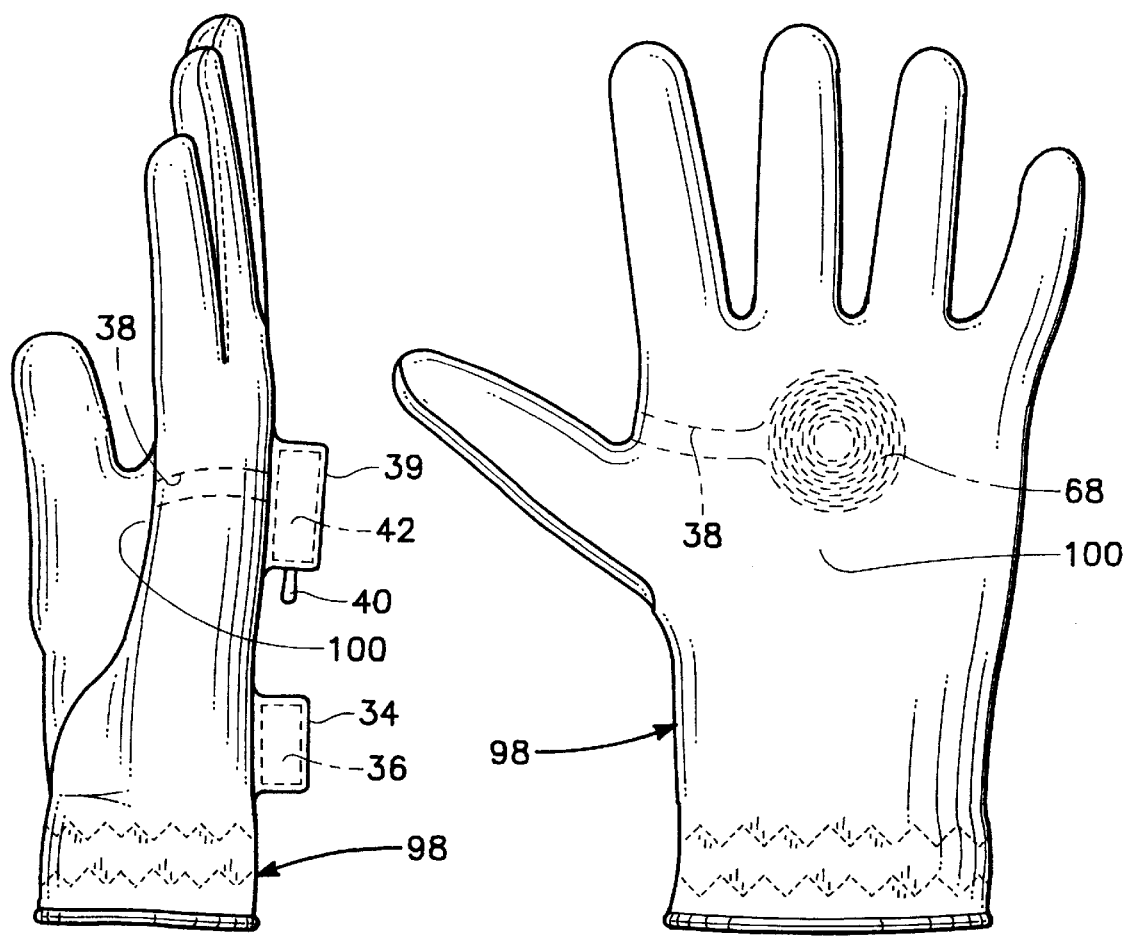
FIG. 6 is a side view of a glove version of metal detector of the present invention.
FIG. 7 is a bottom view, or palm area view, of the metal detector glove of FIG. 6.

The same metal detector circuit shown in FIG. 5 could be mounted on a conventional glove 98, which is shown in FIGS. 6 and 7. It is to be understood that the glove shown in FIGS. 6 and 7 is for a left hand, but the circuit of FIG. 5 could also be incorporated in conjunction with a right handed glove. The search coil 68 is mounted with the palm section 100 of the glove 98. It is to be understood that the user's hand is to be located within the interior of the glove 98. The battery 36 is mounted within a pouch 34 mounted on the backside of the glove 98. Also, the circuit housing 42 is fixedly mounted in some conventional manner on the backside of the glove 98. The fingers of the glove 98 may be cut off permitting the user's tips of the fingers to extend exteriorly of the glove 98, if such is desired.

What is claimed is:

1. A metal detector adapted to be mounted on a human appendage comprising:

a base which includes strap means, said strap means to be used for securement by being tied around an appendage;

a metal detection circuit mounted on said base, said metal detection circuit including a search coil, said metal detection including an annunciator, whereby upon said search coil being located in close proximity to a piece of metal said annunciator is activated becoming known to a human user;

said strap means including an elastic strap which is to automatically adjust to different sizes of appendages; and said search coil being mounted on said elastic strap.

2. The metal detector as defined in claim 1 wherein:

said strap means includes another strap spaced from said elastic strap.

3. A metal detector for mounting on a human hand and wrist comprising:

a solid sheet material base, said base being flexible;

a first strap for securing said base onto the hand;

a second strap securing said base onto the wrist, said second strap being spaced from said first strap; and a metal detection circuit mounted on said base, said metal detection circuit including a search coil, said metal detection circuit including an annunciator, whereby upon said search coil being located in close proximity to a piece of metal said annunciator is activated becoming known to a human user; and by said base being flexible limited normal movement between the hand and the wrist is permitted.

4. The metal detector has defined in claim 3 wherein:

said first strap comprising an elastic band thereby permitting adjustment of said first strap to different sizes of hands.

5. The metal detector as defined in claim 3 wherein:

said search coil being mounted on said first strap.

6. A metal detector mountable on a human hand comprising:

a glove mountable on the hand and supported by the hand; and a metal detection circuit mounted on said glove, said metal detection circuit including a search coil, said metal detection circuit including an annunciator, whereby upon said search coil being located in close proximity to a piece of metal said annunciator is activated becoming known to the human user.

7. The metal detector as defined in claim 6 wherein:

said glove having a palm section adapted to be located directly against the palm of the hand, said search coil being mounted within said palm section.

8. A metal detector for mounting solely on a human hand comprising:

a sheet material housing mountable on the hand and supported by the hand and leaving the hand free to perform other tasks such as grasping of a discovered metallic object; and a metal detection circuit mounted on said housing, said metal detection circuit including a search coil, said metal detection circuit including an annunciator, whereby upon said search coil being located in close proximity to a piece of metal said annunciator is activated becoming known to the human user.

* * * * *